June 19, 1923.

T. GRIFFITHS

PNEUMATIC TIRE

Filed May 16, 1922

Inventor:-
Thomas Griffiths
by Barthel & Barthel
his Attorneys.

Patented June 19, 1923.

1,459,529

UNITED STATES PATENT OFFICE.

THOMAS GRIFFITHS, OF KENSINGTON, LIVERPOOL, ENGLAND.

PNEUMATIC TIRE.

Application filed May 16, 1922. Serial No. 561,525.

*To all whom it may concern:*

Be it known that I, THOMAS GRIFFITHS, a subject of the King of England, residing at 7 Patteson Street, Kensington, Liverpool, in the county of Lancaster, England, have invented new and useful Improvements in or Relating to Pneumatic Tires, of which the following is a specification.

This invention relates to the inner tubes of pneumatic wheel tires, of the type in which the tube is longitudinally or circumferentially divided by india-rubber partitions into a plurality of separate and independent inflatable compartments, so that in the event of deflation of a compartment through puncture another or other compartment or compartments will remain intact.

According to the present invention, an inner tube is divided by means of two, normally unstretched, india-rubber partitions into three longitudinal or circumferential compartments, the arrangement of said partitions being such as to ensure a substantial distance being provided between the points of union of the partitions with the wall of the tube at the "tread" portion thereof. Thus the risk of puncture of the partitions themselves is minimized.

A further characteristic of my invention is the provision on the "tread" portion of the tube, in line with the points of union of the partitions with the tube wall, of longitudinal or circumferential beads or projections which are designed to prevent the spreading or extension of a puncture in the wall from one compartment to another, to give protection to the partitions, and also to deflect the point of a thorn or other thing which might otherwise pierce a partition.

I will further describe my invention with the aid of the accompanying sheet of explanatory drawings showing transverse sections of the tube, and in which drawing:—

Fig. 5 is a similar view showing both of the side compartments deflated;

$a^1$, $a^2$, $a^3$ denote the tube wall and $b$ and $c$ the longitudinal or circumferential partitions. It will be observed that a substantial distance is provided between the points $b^1$, $c^1$, of union of partitions $b$, $c$ with the tube at the tread portion $a^1$.

$d\ d$ indicate rounded longitudinal or circumferential beads or projections which are formed on the "tread" portion $a^1$ of the tube in line with the points $b^1$ $c^1$ of union of partitions $b\ c$ with the tube.

Figure 1:
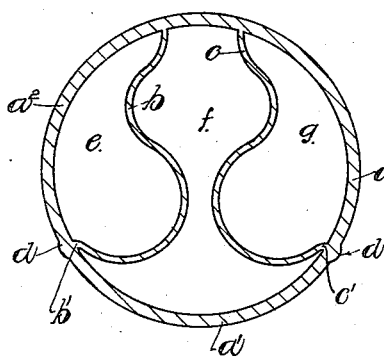
Figure 1 is a cross sectional view of a pneumatic tire showing all the compartments thereof inflated.

Fig. 1 shows the tube when the three compartments $e$, $f$ and $g$ created by the two partitions $b$, $c$ are intact.

Figure 2:
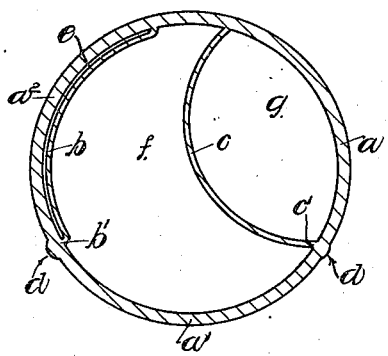
Fig. 2 is a similar view showing one of the side compartments deflated.

In Fig. 2 compartment $e$ is deflated through the puncturing of the portion $a^2$ of the tube wall; compartments $f$ and $g$ are inflated.

Figure 3:
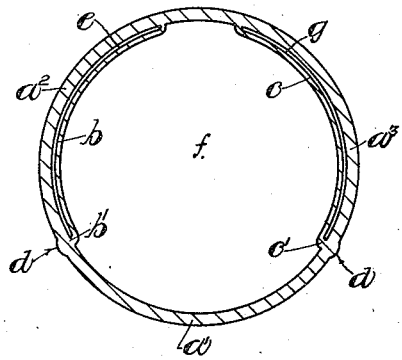
Fig. 3 is a similar view showing an intermediate compartment of the tire deflated.
Figure 3:
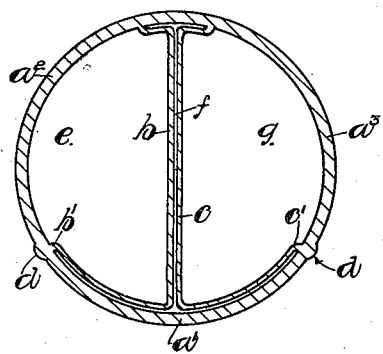

In Fig. 3 compartment $f$ is deflated through the puncturing of the tread portion $a^1$ of the tube wall; compartments $e$ and $g$ are inflated.

Figure 4:
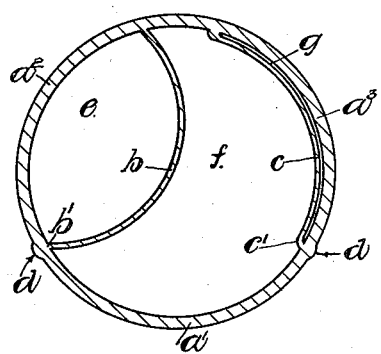
Fig. 4 is a similar view illustrating a reverse condition of that shown in Fig. 2.

In Fig. 4 compartment $g$ is deflated through the puncturing of the portion $a^3$ of the tube wall; compartments $e$ and $f$ are inflated.

In Fig. 5 compartment $e$ and $g$ are deflated through the puncturing of the portions $a^2$ and $a^3$ of the tube wall; compartment $f$ is inflated.

Figure 6:
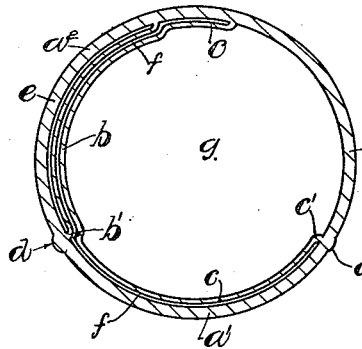
Fig. 6 is a similar view showing a side compartment and an intermediate compartment deflated.

In Fig. 6 compartments $e$ and $f$ are deflated through the puncturing of the portions $a^1$ and $a^2$ of the tube wall; compartment $g$ is inflated.

Figure 7:
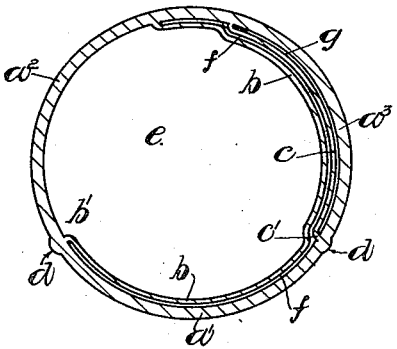
Fig. 7 is a similar view showing the reverse of that illustrated in Fig. 6.

In Fig. 7 compartments $f$ and $g$ are deflated through the puncturing of the portions $a^1$ and $a^3$ of the tube wall; compartment $e$ is inflated.

The inflation of compartments $e\ f\ g$ of the tube may be effected in any convenient manner.

What I claim as my invention and desire to secure by Letters-Patent is:—

An inner tube for a pneumatic tire which tube has tread and base portions and is divided by means of two normally unstretched india rubber partitions into a substantially vertical middle compartment and two substantially vertical side compartments, said partitions having parallel lines of union with the base portion of the tube and with the tread portion of the tube, the spacing of the tread edges of the partitions being greater than the spacing of the base edges of the partitions, the arrangement of said partitions being such as to insure a substantial distance being provided between the lines of union of the partitions with the wall of the tube, and exterior beads opposite the lines of union of the partition edges with the tread portion of the tube.

In testimony whereof I affix my signature in the presence of two witnesses.

THOMAS GRIFFITHS.

Witnesses:
EMILY BURNETT,
H. J. GREGORY.